UNITED STATES PATENT OFFICE.

ELMER F. MACKUSICK, OF NEW YORK, N. Y., ASSIGNOR TO THE ELECTRO GAS COMPANY, OF WEST VIRGINIA.

PROCESS OF GENERATING GAS FROM CARBIDS.

SPECIFICATION forming part of Letters Patent No. 588,230, dated August 17, 1897.

Application filed June 17, 1897. Serial No. 641,181. (No specimens.)

*To all whom it may concern:*

Be it known that I, ELMER F. MACKUSICK, of the city, county, and State of New York, have invented a new and useful Improvement in Processes of Generating Gas from Carbids, of which the following is a full, true, and exact description.

It is important to reduce the violent action of water on metallic carbids in the production of gas for technical purposes. Different means have been devised to accomplish this object, but all of them have very material disadvantages. If, however, my process is followed, which is the subject of this specification, then it is possible to reduce the liberation of gas to any desired degree in the most simple and effective manner.

In my process the water employed for the decomposition of the carbid is combined with a substance which dissolves or mixes with water but does not react upon metallic carbids. Among the many substances available for this purpose glycerin is preferred by me because it can be recovered so very easily from the waste liquid, which cheapens my process very much, and because it does not in any way create danger of fire, and because it does not injure the gas-generating apparatus, as would acids and alkalies, which otherwise also reduce the gas-generating power of water.

The following is an example of the manner in which my invention can be carried into effect: For each pound of carbid of calcium in the production of acetylene gas one pint of water is employed, which is treated with glycerin in proportions varying with the current of gas desired. For example, ninety-five per cent. of glycerin added to five per cent. of water give on contact with carbid of calcium a very steady and slow current of gas, whereas a mixture of fifty per cent. of glycerin with fifty per cent. of water gives a rapid generation of acetylene gas. By a proper selection of such mixtures any kind of a generation of gas from single bubbles to a violent current may be accomplished. From the waste liquids, containing glycerin, water, and the formed metallic hydroxids, the glycerin is separated after the methods well known in the arts, and can be used again and again in the process.

Instead of glycerin a great many other substances can be employed. For example, solutions of carbohydrates, such as dextrine, sugar, &c. The latter substance may be advantageously used in the form of molasses. I have found also that glucose, gelatin, albumen, and various soluble gums can be used, but I prefer the glycerin, as above stated.

What I claim as my invention, and desire to secure by Letters Patent, is—

1. The process of generating gas from metallic carbids, which consists in treating said carbids with a mixture or compound of water and a substance which is non-volatile, non-inflammable and recoverable, and which does not react upon the metallic carbids, exposing the whole mass of carbid to the action of the liquid, which is properly compounded according to the desired current of gas, substantially as described.

2. The process of generating gas from metallic carbids, which consists in treating said carbids with a mixture of water and a non-volatile, non-inflammable and recoverable body, such as glycerin, exposing the whole mass of carbid to the action of the liquid, which is properly compounded by mixing water with glycerin in accordance with the desired strength of the current of gas, substantially as described.

In testimony whereof I have signed my name to this specification in the presence of two subscribing witnesses.

ELMER F. MACKUSICK.

Witnesses:
GEO. T. PINCKNEY,
S. T. HAVILAND.